(12) United States Patent
Grant

(10) Patent No.: US 10,457,528 B2
(45) Date of Patent: Oct. 29, 2019

(54) DAVIT ARM

(71) Applicant: Engineered Supply L.L.C., Stillwater, MN (US)

(72) Inventor: Arlen Paul Grant, Stillwater, MN (US)

(73) Assignee: Engineered Supply, LLC, Stillwater, MN (US)

( * ) Notice: Subject to any disclaimer, the term of this patent is extended or adjusted under 35 U.S.C. 154(b) by 0 days.

(21) Appl. No.: 15/077,913

(22) Filed: Mar. 23, 2016

(65) Prior Publication Data

US 2016/0281909 A1 Sep. 29, 2016

Related U.S. Application Data

(60) Provisional application No. 62/137,170, filed on Mar. 23, 2015.

(51) Int. Cl.
| | | |
|---|---|---|
| *B66D 1/36* | (2006.01) | |
| *B66C 23/00* | (2006.01) | |
| *F16M 11/18* | (2006.01) | |
| *B66C 23/02* | (2006.01) | |

(52) U.S. Cl.
CPC ............ *B66C 23/00* (2013.01); *B66C 23/022* (2013.01); *F16M 11/18* (2013.01)

(58) Field of Classification Search
CPC ..... F16M 11/18; F16M 13/022; B66C 23/022
USPC ................ 248/125.1; 212/345; 254/284, 334
See application file for complete search history.

(56) References Cited

U.S. PATENT DOCUMENTS

| | | | |
|---|---|---|---|
| 1,978,999 A * | 10/1934 | Jones | ...................... B66C 23/48 |
| | | | 212/345 |
| 2,260,772 A | 10/1941 | Coates et al. | |
| 2,667,649 A | 2/1954 | Elling | |
| 5,498,011 A | 3/1996 | Kilada et al. | |
| 6,082,493 A | 7/2000 | Mason | |
| 6,592,101 B2 * | 7/2003 | Vetesnik | ............... B66C 23/166 |
| | | | 254/284 |
| 6,899,238 B2 | 5/2005 | Austin et al. | |
| 7,828,116 B2 | 11/2010 | Vetesnik | |
| 8,511,646 B1 * | 8/2013 | Woodard | .............. B66C 23/485 |
| | | | 254/334 |
| 2004/0118635 A1 | 6/2004 | Sun et al. | |
| 2006/0133916 A1 | 6/2006 | Wood | |
| 2006/0208240 A1 | 9/2006 | Spittle et al. | |
| 2007/0227995 A1 | 10/2007 | Casebolt et al. | |
| 2009/0194368 A1 | 8/2009 | Price | |
| 2013/0048424 A1 | 2/2013 | Bemis | |
| 2016/0017619 A1 | 1/2016 | Pitbladdo | |
| 2016/0061702 A1 * | 3/2016 | Yang | ........................ G01N 3/22 |
| | | | 73/847 |

* cited by examiner

*Primary Examiner* — Todd M Epps
(74) *Attorney, Agent, or Firm* — Vidas, Arrett & Steinkraus, PA

(57) ABSTRACT

In some embodiments, a davit arm system comprises a davit body arranged to engage a support and an arm supported by the davit body. The arm is moveable along a length of the davit body. In some embodiments, a bearing is oriented between said arm and said davit body. In some embodiments, a bearing a polymer sleeve. In some embodiments, a bearing comprises rollers. In some embodiments, a bearing comprises ball transfer bearings. In some embodiments, a bearing excludes moving parts.

19 Claims, 10 Drawing Sheets

DAVIT ARM

CROSS-REFERENCE TO RELATED APPLICATIONS

This application claims the benefit of U.S. Application No. 62/137,170, filed Mar. 23, 2015, the entire content of which is hereby incorporated herein by reference.

BACKGROUND OF THE INVENTION

This invention relates to suspended access systems, davit arms and the like.

Davits are generally known in the art. In buildings, davits may be used on the roof to suspend personnel and/or platforms, such as maintenance platforms, window washing platforms, etc.

Davit arm systems can be removable, for example breaking down for storage. When it is necessary for a worker to use the davit arm system, the davit is often erected for the project, then taken down and stored.

Davit systems tend to be large and require an appropriately large amount of roof area during erection. In some instances, limited roof size will limit the size of davit arm systems that can be used.

There remains a need for novel davit arm designs.

There remains a need for davit arm systems capable of being erected and deployed on a roof having limited area.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a davit arm system comprises a davit body arranged to engage a support and an arm supported by the davit body. The arm is moveable along a length of the davit body. In some embodiments, a bearing is oriented between said arm and said davit body. In some embodiments, a bearing a polymer sleeve. In some embodiments, a bearing comprises rollers. In some embodiments, a bearing comprises ball transfer bearings. In some embodiments, a bearing excludes moving parts.

In some embodiments, the arm comprises a mount engaged with the davit body and an arm body detachable from the mount. In some embodiments, the mount comprises a receptacle that defines a cavity, at least a portion of the arm body is received in the cavity. In some embodiments, the mount and the arm body comprise complimentary apertures arranged to receive a fastener.

In some embodiments, the support comprises a plurality of support apertures and the davit body comprises a plurality of davit apertures, the davit apertures aligned with the support apertures.

In some embodiments, a method comprises providing a davit body comprising an arm that is moveable along a length of the davit body and moving the arm from a first position to a second position. In some embodiments, the movement comprises raising the arm. In some embodiments, a tensioning cable is used, for example extending between the arm and a support anchor. In some embodiments, the method comprising fixing the arm in the second position. In some embodiments, the arm comprises an arm body and a mount, the mount engaged to the davit body, the method comprising attaching the arm body to the mount.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
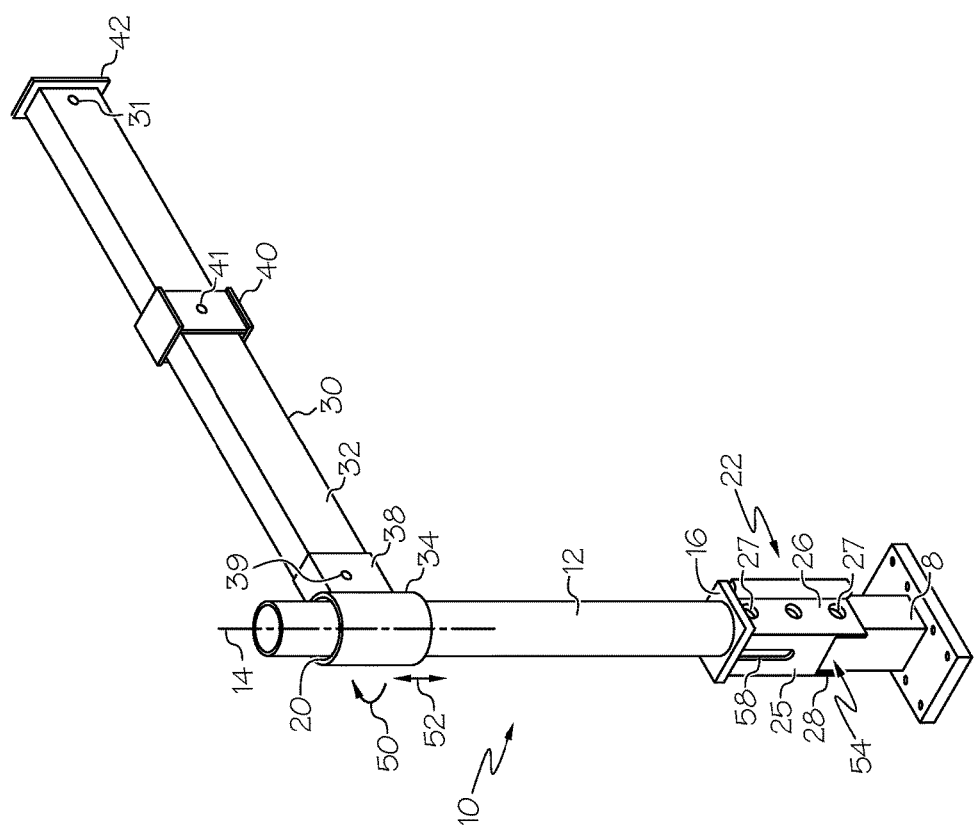
FIG. 1 shows an embodiment of a davit arm system.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
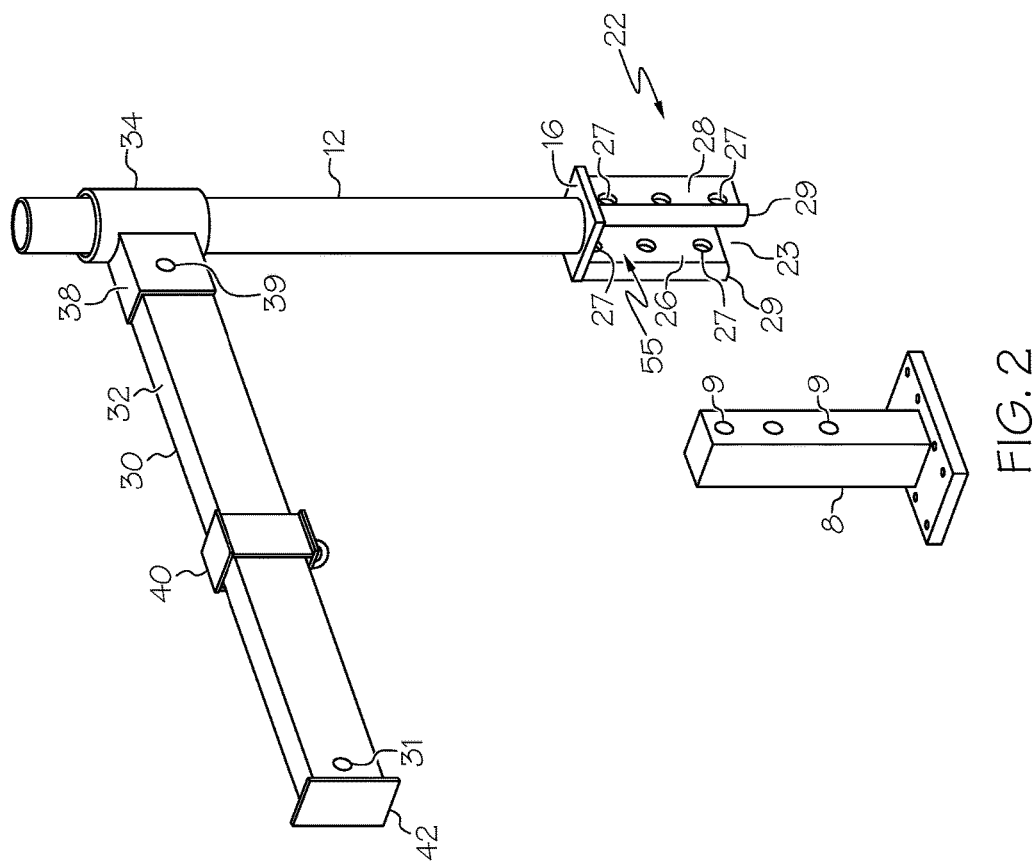
FIG. 2 shows the davit arm system of FIG. 1 from a different viewing angle.

FIGS. 1 and 2 each show an embodiment of a davit arm system 10. FIG. 2 shows a viewing angle different from that of FIG. 1, and FIG. 2 also shows the davit arm system 10 detached from an anchor 8.

In some embodiments, a davit arm system 10 comprises a davit body 12 that is attachable to an anchor 8 that supports the davit arm system 10. Desirably, the davit arm system 10 comprises an arm 30. In some embodiments, the arm 30 is supported by the davit body 12 at one end and is configured to support a load at the other end. In some embodiments, the arm 30 supports a trolley 40, and the trolley 40 is moveable along a length of the arm 30.

Desirably, the arm 30 is moveable with respect to the davit body 12. In some embodiments, the arm 30 can rotate 50 around a central longitudinal axis 14 of the davit body 12. In some embodiments, the arm 30 is moveable 52 along the length of the davit body 12. When the davit body 12 is oriented vertically, moving the arm 30 along the length of the davit body 12 can adjust the height of the arm 30.

In some embodiments, the arm 30 comprises a mount 34 and an arm body 32 that is attachable to and removable from the mount 34. In some embodiments, the mount 34 is moveably attached to the davit body 12 and is moveable 52 along the length of the davit body 12. In some embodiments, the mount 34 surrounds a portion of the davit body 12. The mount 34 can have any suitable shape. In some embodiments, a cross-sectional shape of the mount 34 is similar to a cross-sectional shape of the davit body 12.

In some embodiments, a bearing 20 is provided between the davit body 12 and arm 30/mount 34. In some embodiments, a bearing 20 comprises a tubular shape. In some embodiments, a bearing 20 comprises a sleeve bearing. In some embodiments, a cross-sectional shape of the bearing 20 is similar to a cross-sectional shape of the mount 34 and/or the davit body 12. In some embodiments, the bearing 20 consists of a single material, such as a polymer such as UHMW polyethylene.

In some embodiments, the interface between the davit body 12 and the mount 34 excludes rollers, roller bearings or other moving parts, which can provide better resistance to outdoor environments.

In some embodiments, the interface between the davit body 12 and the mount 34 comprises rollers or any suitable friction reducing components. In some embodiments, rollers can reduce friction as the arm 30 pivots around the davit body 12. In some embodiments, rollers can reduce friction as the arm 30 moves along the length of the davit body 12. In some embodiments, the interface between the davit body 12 and the mount 34 comprises one or more ball transfer bearings. In some embodiments, a ball transfer bearing can comprise a flange attached to an inner surface of the arm 30/mount 34 and comprise a ball in contact with the davit body 12. In some embodiments, a plurality of ball transfer bearings are mounted about an inner surface of arm 30/mount 34.

An arm body 32 can be attached to a mount 34 using any suitable method. In some embodiments, the mount 34 comprises a receptacle 38 arranged to receive a portion of the arm body 32. In some embodiments, a portion of the arm body 32 is inserted into a cavity defined by the receptacle 38. In some embodiments, the mount 34 and the arm body 32 each define at least one aperture 39, and a fastener such as pin can be installed through the apertures 39.

The arm 30 can have any suitable shape. In some embodiments, the arm 30 comprises a tubular cross-section having a hollow interior. In some embodiments, the arm 30 comprises an I-shaped cross-section. In some embodiments, the arm 30 comprises an end plate 42 arranged to stop travel of a trolley 40.

A trolley 40 can have any suitable size and shape. In some embodiments, a trolley 40 can be fixed in place along the length of the arm 30. In some embodiments, the trolley 40 comprises at least one aperture 41 and the arm 30 comprises at least one aperture 31, wherein pin can be placed through the apertures 31, 41 to fix the trolley 40 in place.

The davit body 12 can have any suitable shape. In some embodiments, the davit body 12 has a tubular cross-sectional shape. In some embodiments, at least a portion of the davit body 12 has a circular cross-sectional shape, which can allow the arm 30 to pivot about a central axis 14 of the davit body 12. In some embodiments, a cross-sectional shape of the davit body 12 is constant along a length portion that the arm 30 is able to traverse.

In some embodiments, the davit body 12 comprises a stop 16 arranged to limit movement of the arm 30 along the length of the davit body 12. A stop 16 can have any suitable size and shape, and in some embodiments comprises a protrusion extending from a surface of the davit body 12. In some embodiments, a stop 16 comprises a plate.

Desirably, the davit body 12 comprises a mounting portion 22 arranged to engage an anchor 8. The mounting portion 22 can have any suitable shape and be arranged to engage an anchor 8 in any suitable manner. In some embodiments, the mounting portion 22 comprises a first portion 26 and a second portion 28 arranged on opposite sides of the mounting portion 22, defining a cavity 23 therebetween. Desirably, the first portion 26 and second portion 28 can be arranged on opposite sides of an anchor 8 with at least a portion of the anchor 8 oriented in the cavity 23.

Desirably, the mounting portion 22 can be attached to the anchor 8 using any suitable method. In some embodiments, the first and second portions 26, 28 each comprise apertures 27 and the anchor 8 comprises apertures 9. When the davit body 12 is properly oriented with respect to the anchor 8, pins can be installed through the apertures 27, 9 to secure the davit body 12 to the anchor 8.

In some embodiments, the mounting portion 22 comprises a wall portion 25 attached between the first and second portions 26, 28, which can reinforce the mounting portion 22. Desirably, the wall portion 25 has a length along the davit body 12 that is less than that of the first and second portions 26, 28, leaving a window 54 that aids in erecting the davit body 12. In some embodiments, the wall portion 25 comprises a hoop/anchoring structure, or alternatively comprises an aperture 58 that allows a hoop/anchoring structure of the anchor 8 to pass through the aperture 58.

In some embodiments, the mounting portion 22 omits structure located opposite the wall portion 25. In some embodiments, the mounting portion 22 defines a window 55 between the first and second portions 26, 28, wherein the window 55 extends substantially the entire length of the mounting portion 22. The window 55 aids in erecting the davit body 12 as described below. In some embodiments, the mounting portion 22 comprises a reinforcing member 29 attached to each of the first and second portions 26, 28 on opposite sides of the window 55.

Figure 3:
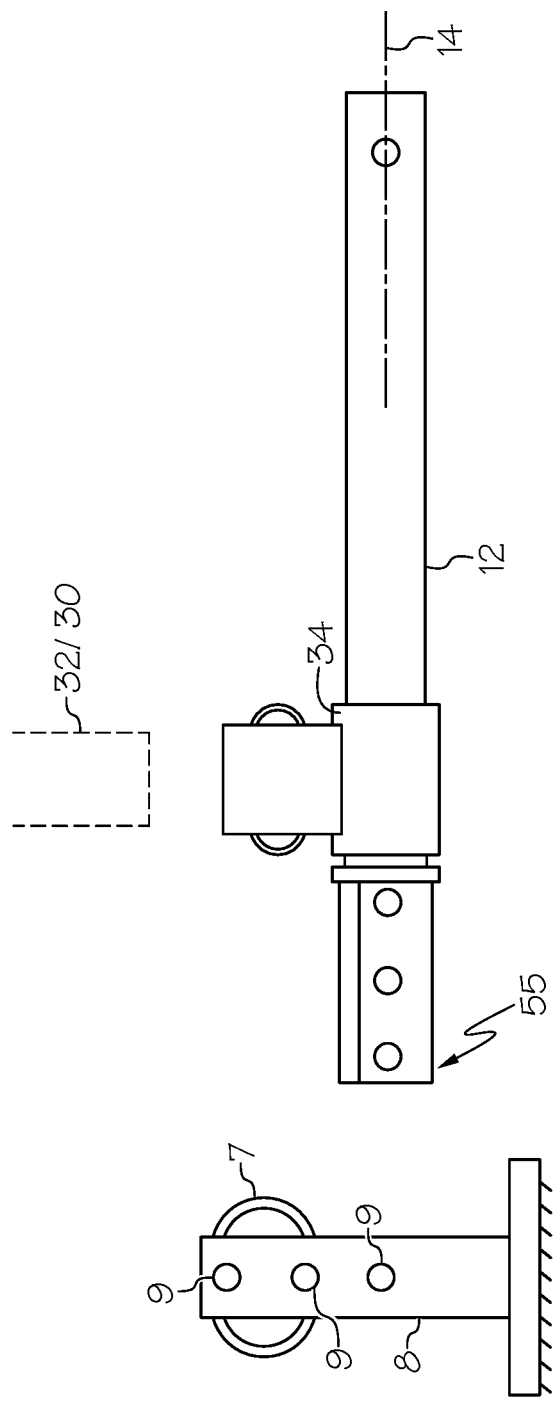
FIGS. 3-9 show embodiments of davit arm systems being installed.

FIG. 3-9 show an embodiment of a davit arm system 10 being erected. FIG. 3 shows the davit body 12 detached from the anchor 8. Desirably, an anchor 8 is fixedly attached to a supporting structure, such as a building. In some embodiments, an anchor 8 comprises a tubular body having a plurality of apertures 9. In some embodiments, an anchor 8 comprises a hoop structure 7 fixedly attached to the anchor 8. In some embodiments, an anchor 8 comprises a plurality of hoops 7 for additional flexibility.

The davit body 12 is positioned in a first orientation, for example wherein its longitudinal axis 14 is substantially horizontal. In some embodiments, the arm 30 of the davit arm system 10 is not attached to the davit body 12. In some embodiments, the arm 30 is attached to the davit body 12 and oriented in a first position along the length of the davit body 12. In some embodiments, when the arm 30 comprises a mount 34 and an arm body 32, the arm body 32 can be detached from the mount 34, and the mount 34 is oriented in a first position along the length of the davit body 12.

Figure 4:
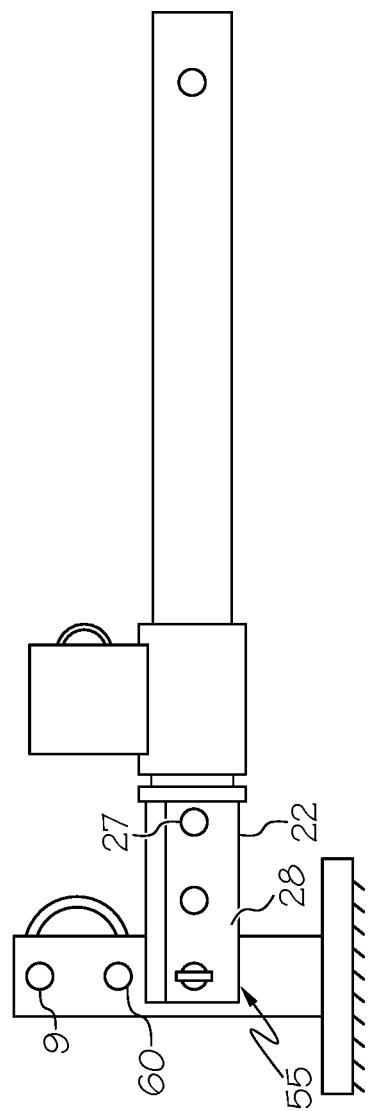

FIG. 4 shows the davit body 12 still in a first/horizontal orientation. The davit body 12 is positioned such that the anchor 8 occupies a portion of the cavity 55 defined by the mounting portion 22. The first and second portions 26, 28 of the mounting portion 22 straddle the anchor 8. A pin 60 has been installed through the lowermost apertures 9, 27 of the respective mounting portion 22 and anchor 8, securing the davit body 12 to the anchor 8. In this orientation, the davit body 12 can be raised, for example being rotated about the pin 60.

Figure 5:
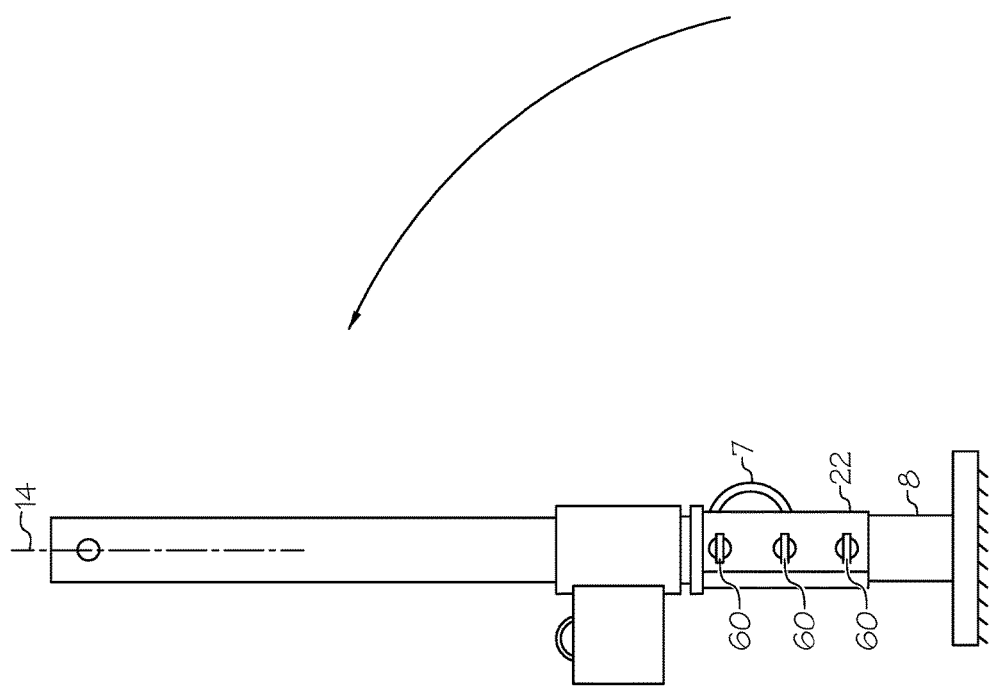

FIG. 5 shows the davit body 12 after being raised. The davit body 12 is positioned in a second orientation, for example wherein the longitudinal axis 14 is arranged vertically. The davit body 12 is affixed to the anchor 8. For example, in some embodiments, pins 60 have been installed through the remaining apertures 9, 27 in the anchor 8 and mounting portion 22. In some embodiments, for example when the anchor 8 comprises a hoop structure 7 and the mounting portion 22 comprises an aperture 58 (see FIG. 1), the hoop structure 7 extends through the aperture 58.

Figure 6:
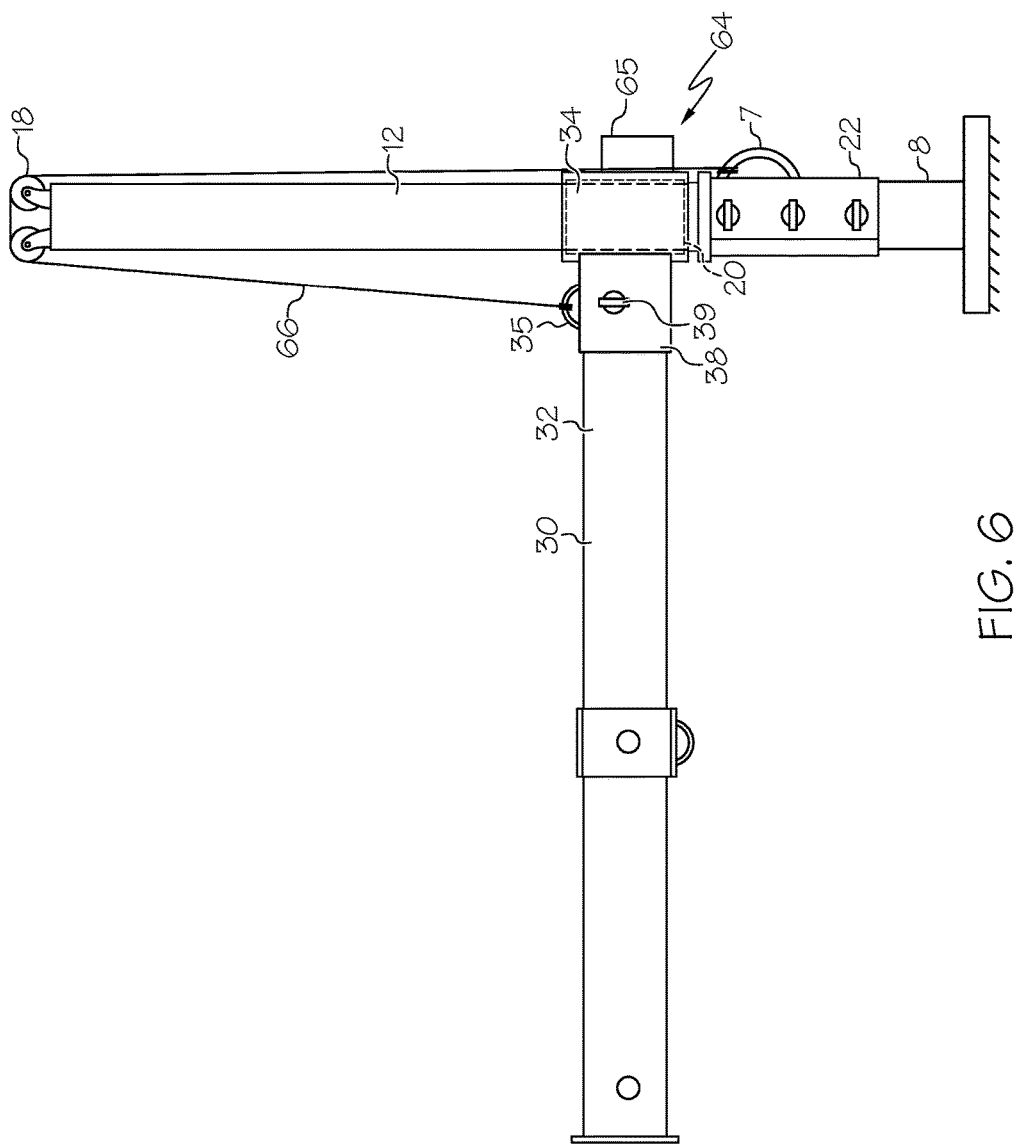

FIG. 6 shows the davit body 12 in its second orientation (e.g. vertical). If the arm 30, or a portion 32 of the arm, has not been attached to the davit body 12, the arm 30 or portion 32 can be attached at this time. For example, the arm body 32 can be received in the receptacle 38 of the mount 34, and a pin 60 can be installed through the receptacle 38 and arm body 32, thereby affixing the arm body 32 to the mount 34.

The arm 30 is in a first position along the length of the davit body 12. Desirably, the arm 30 can now be moved along the length of the davit body 12, which typically raises the arm 30. The arm 30 can be raised using any suitable method.

In some embodiments, the arm 30, or the mount 34, is provided with an anchor 35, such as a hoop structure. In some embodiments, either the anchor 8 or the davit body 12 (e.g. mounting portion 22) is provided with another anchor 7, such as a hoop structure. In some embodiments, a tension line system 64 is attached between the anchors 7, 35 and arranged such that shortening the tension line 64 will move the arm 30/mount 34 along the length of the davit body 12. In some embodiments, the tension line system 64 comprises a winch or ratcheting system 65 arranged to tension the tension line 64.

In some embodiments, the davit body 12 comprises at least one pulley 18 arranged to support the tension line 66. In some embodiments, one or more pulleys 18 are provided at an end of the davit body 12.

Figure 7:
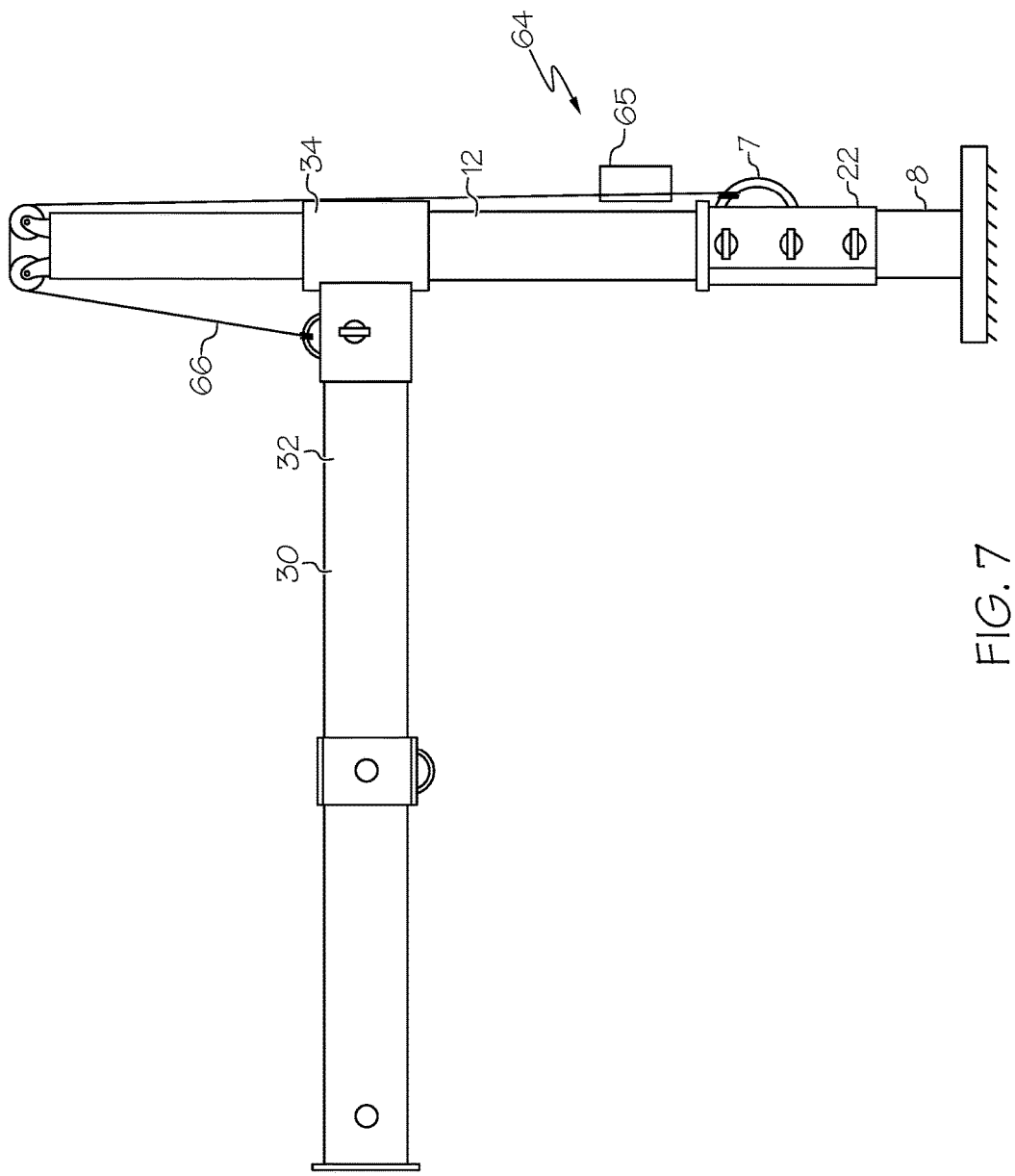

FIG. 7 shows the arm 30 being moved along the length of the davit body 12 as the tension line 66 is shortened.

Figure 8:
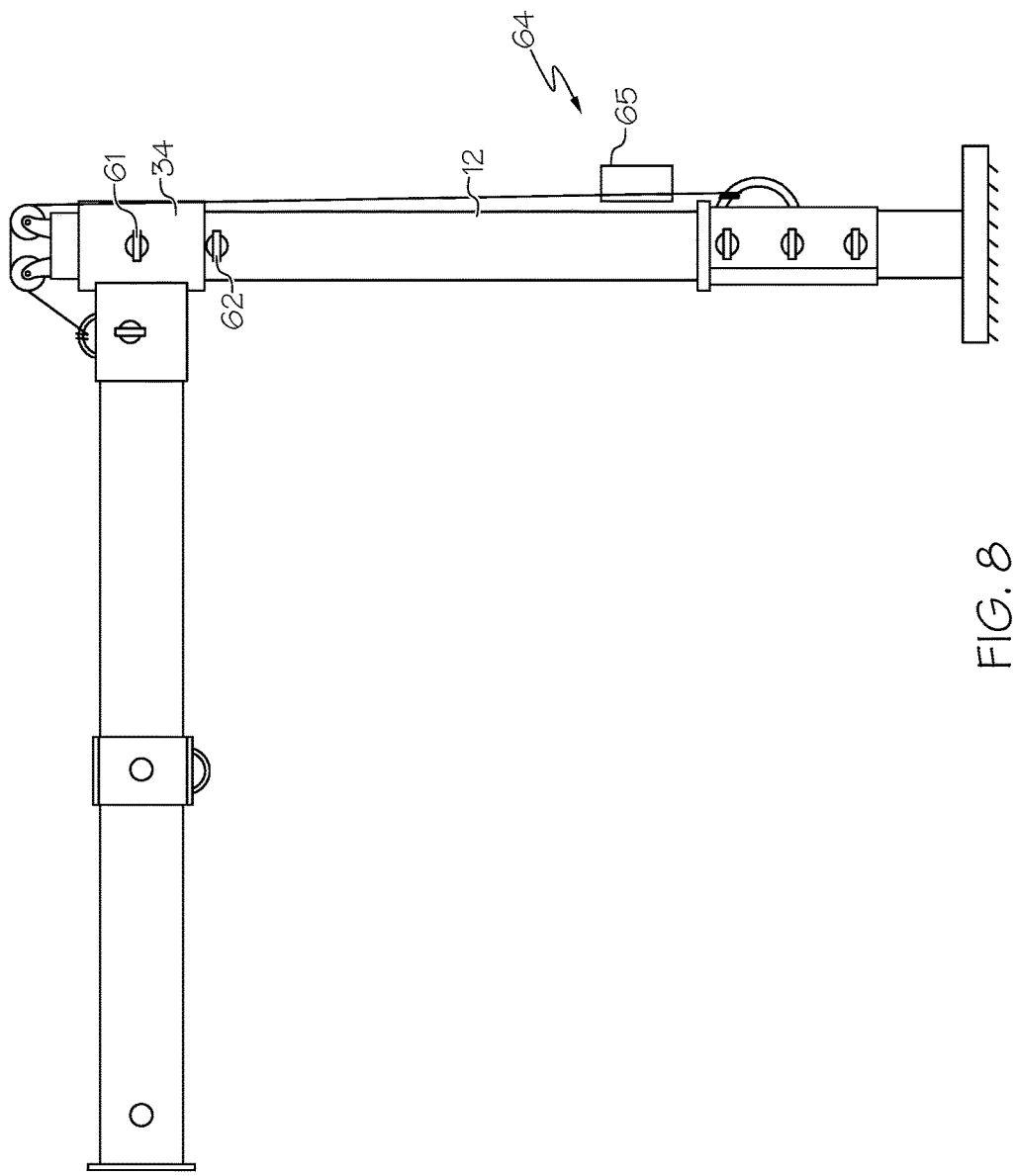

FIG. 8 shows the arm 30 in a second orientation along the length of the davit body 12. The arm 30 has reached its operating height. In some embodiments, a pin 61 can be installed that extends through the arm 30 (e.g. the mount 34) and the davit body 12, which will hold the arm 30 fixed with respect to the davit body 12. In some embodiments, a pin 62 can be installed that extends though the davit body 12 and abuts the arm 30/mount 34, thereby supporting the arm 30/mount 34. This will hold the arm 30 in its second location along the length of the davit body 12, but still allow rotation of the arm 30 about the davit body 12.

Figure 9:
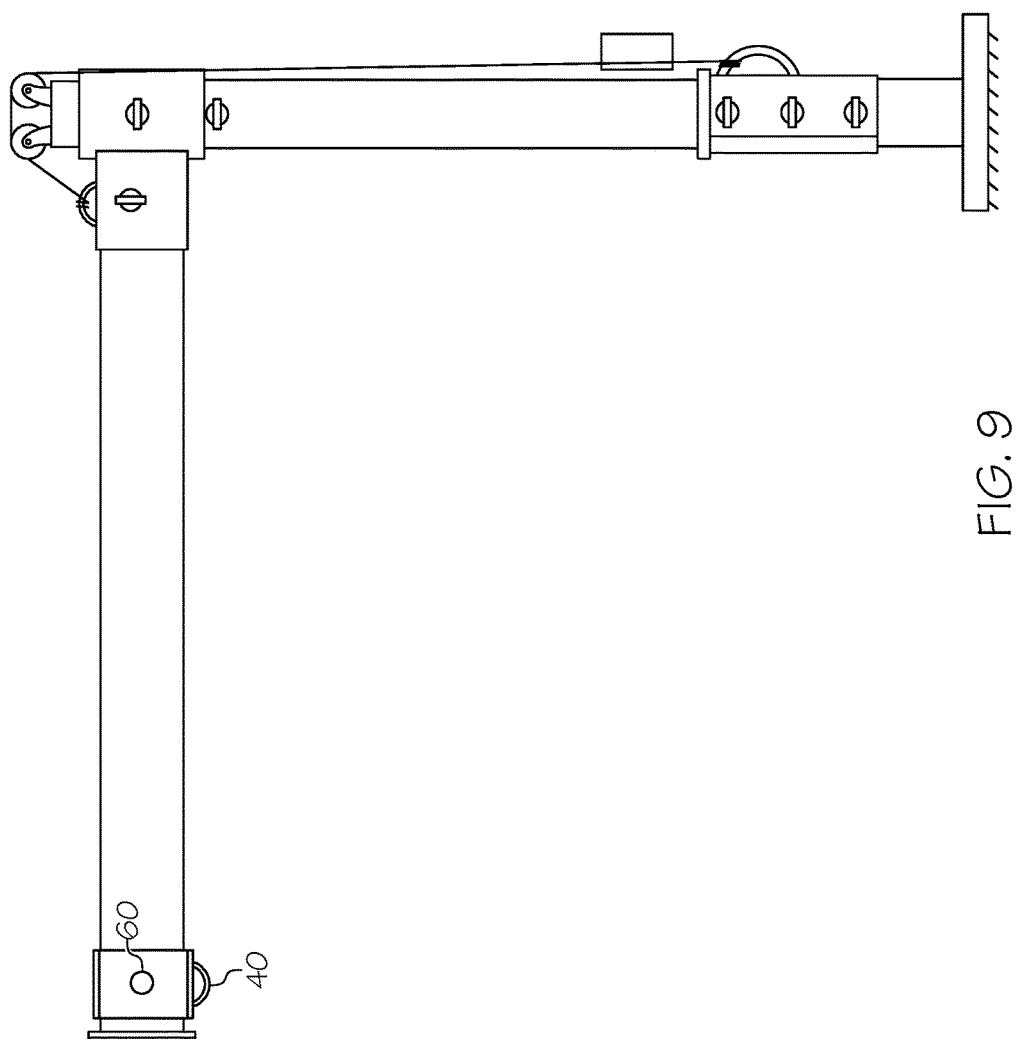

FIG. 9 shows the trolley 40 located at an end of the arm 30, and fixed in place with a pin 60.

Figure 10:
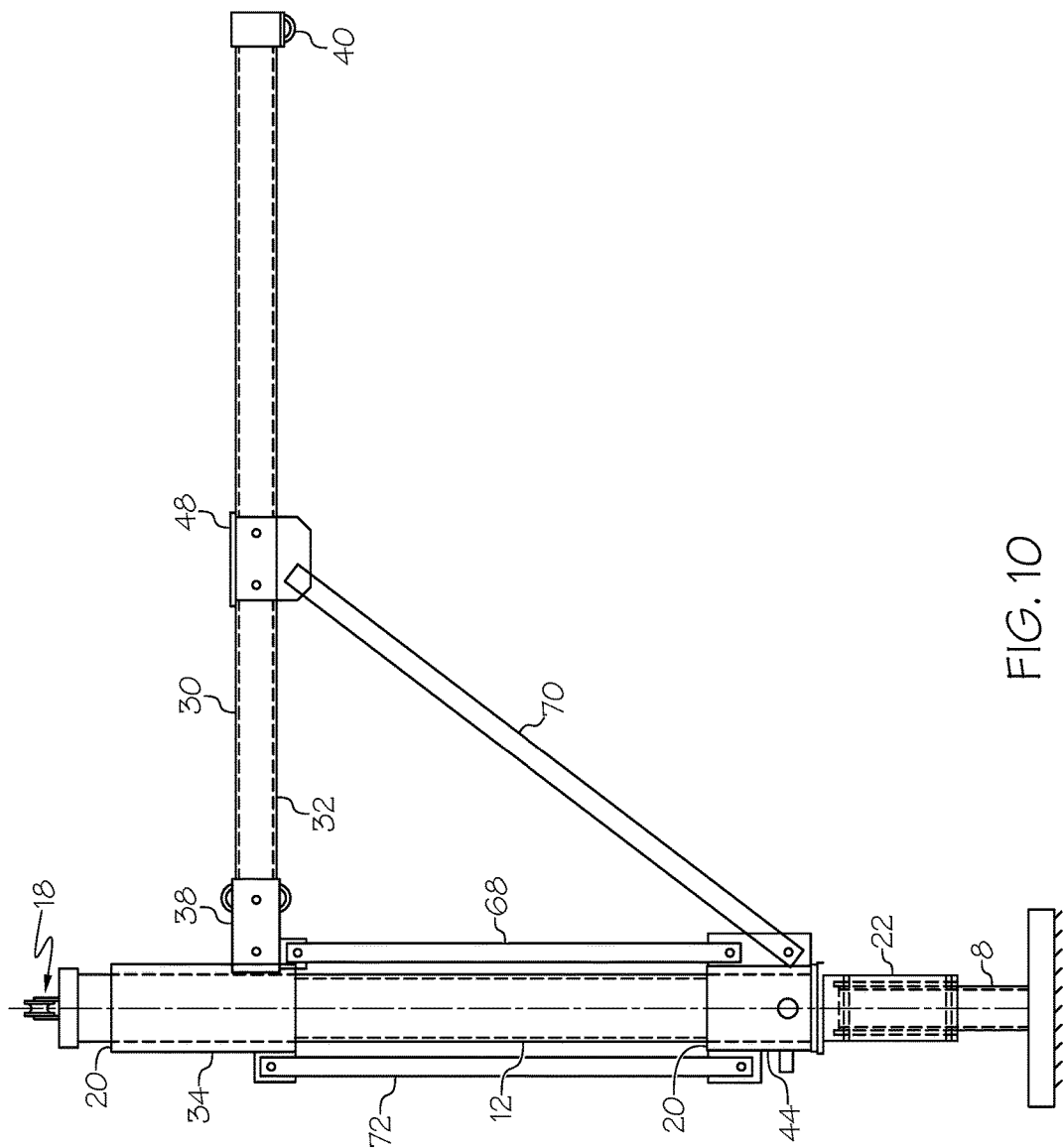
FIG. 10 shows another embodiment of a davit arm system.

FIG. 10 shows another embodiment of a davit arm assembly 10. In some embodiments, bracing members are used, for example when the davit arm assembly 10 comprises a relatively long arm 30.

In some embodiments, the davit body 12 comprises a second mount 44 located proximate to the mounting portion 22. In some embodiments, the second mount 44 is not required to move along a length of the davit body 12. In some embodiments, the second mount 44 is arranged to rotate about the davit body 12. Desirably, the second mount 44 provides anchoring connections for one or more bracing members.

In some embodiments, the davit arm assembly 10 comprises a first bracing member 68 attached between the first mount 34 and the second mount 44. The first bracing member 68 can be attached to each mount 34, 44 using any suitable method, such as pinned connections. The first bracing member 68 can be attached to the first mount 34 before the arm 30 is raised, then attached to the second mount 44 when the arm 30 has reached the second position along the length of the davit body 12.

In some embodiments, arm 30 comprises a bracing anchor 48 arranged to attach to a bracing member. In some embodiments, the bracing anchor 48 comprises a tubular structure that surrounds the arm 30 and is moveable along a length of the arm 30. Desirably, the bracing anchor 48 can be fixed in place along the length of the arm 30.

In some embodiments, a second bracing member 70 is attached between the bracing anchor 48 and the second mount 44. The second bracing member 70 can be attached to the bracing anchor 48 and the second mount 44 using any suitable method, such as pinned connections. The bracing anchor 48 can be fixed in place along the length of the arm 30 and the second bracing member 70 can be attached to the bracing anchor 48 before the arm 30 is raised. The second bracing member 70 can be attached to the second mount 44 when the arm 30 has reached the second position along the length of the davit body 12.

In some embodiments, a bracing member 72 can be provided on the side opposite the arm 30.

Although FIG. 10 shows first, second and third bracing members, various embodiments of a davit arm assembly 10 can use any single bracing member or any suitable combination of the bracing members 68, 70, 72.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A davit arm system comprising:
   an anchor fixedly attached to a building, the anchor comprising an anchor aperture;
   a davit body attached to the anchor, said davit body having a length and comprising a mounting portion, a tension line and a mount, the mount moveable along the length of the davit body, the mount comprising a receptacle that defines a cavity, the tension line arranged to move the mount along the length of the davit body as the tension line is shortened, the mounting portion arranged to engage the anchor, the mounting portion comprising a body aperture, the body aperture aligned with the anchor aperture; and an arm attached to the mount and supported by said davit body, a portion of the arm oriented in the cavity, a longitudinal axis of said arm oriented perpendicular to a longitudinal axis of said davit body, said arm moveable along the length of the davit body with the mount.

2. The davit arm system of claim 1, comprising a bearing oriented between said mount and said davit body.

3. The davit arm system of claim 2, wherein said bearing comprises a polymer tube.

4. The davit arm system of claim 2, wherein said bearing consists of a polymeric material.

5. The davit arm system of claim 2, wherein said bearing excludes rollers.

6. The davit arm system of claim 2, wherein said bearing comprises a roller.

7. The davit arm system of claim 2, wherein said bearing comprises a ball transfer.

8. The davit arm system of claim 1, wherein said arm is detachable from said mount.

9. The davit arm system of claim 1, the tension line attached to the mount and the mounting portion.

10. The davit arm system of claim 1, wherein said mount and said arm comprise complimentary apertures arranged to receive a pin, the arm detachable from the mount by removing the pin.

11. The davit arm system of claim 1, wherein said davit body and said arm comprise complimentary apertures arranged to receive a fastener.

12. The davit arm system of claim 1, wherein said arm comprises an anchor.

13. The davit arm system of claim 1, wherein said anchor comprises a first anchor aperture and a second anchor aperture offset from the first anchor aperture and the mounting portion comprising a first flat portion and an opposed second flat portion, the first flat portion and the second flat portion comprising a first plurality of body apertures and a second plurality of body apertures, a first fastener extending through the first plurality of body apertures and the first anchor aperture, a second fastener extending through the second plurality of body apertures and the second anchor aperture.

14. A method of using a davit arm system comprising:
providing a davit body having a length, said davit body comprising a mounting portion and a mount, the mount moveable along the length, the mount comprising a receptacle that defines a cavity, the mounting portion comprising a first body aperture and a second body aperture;

attaching said davit body to an anchor that is fixedly attached to a building, the anchor comprising a first anchor aperture and a second anchor aperture, said attaching comprising aligning said first body aperture with said first anchor aperture and installing a pin through the first body aperture and the first anchor aperture;

raising the davit body by rotating the davit body about the pin, aligning the second body aperture with the second anchor aperture and installing a second pin through the second body aperture and the second anchor aperture;

providing an arm, orienting a portion of said arm in the cavity of the receptacle and attaching the arm to the mount; and raising said arm by moving said mount along said length of said davit body from a first position to a second position.

15. The method of claim 14, further comprising fixing said arm in said second position.

16. The method of claim 14, the davit body comprising a tension line, wherein said raising said arm comprises shortening said tension line.

17. The method of claim 16, wherein said shortening said tension line comprises using a winch or ratcheting system.

18. The method of claim 16, comprising attaching a first end of the tension line to said mounting portion and attaching a second end of the tension line to said mount.

19. The method of claim 18, comprising orienting said tension line in a pulley provided at an end of the davit body.

* * * * *